(12) United States Patent
Umeyama et al.

(10) Patent No.: US 11,811,108 B2
(45) Date of Patent: Nov. 7, 2023

(54) CENTRIFUGAL COMPRESSOR FOR FUEL CELL

(71) Applicant: KABUSHIKI KAISHA TOYOTA JIDOSHOKKI, Aichi-ken (JP)

(72) Inventors: Ryo Umeyama, Kariya (JP); Yoshiyuki Nakane, Kariya (JP); Takahito Kunieda, Kariya (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 149 days.

(21) Appl. No.: 17/441,443

(22) PCT Filed: Mar. 24, 2020

(86) PCT No.: PCT/JP2020/012903
§ 371 (c)(1),
(2) Date: Sep. 21, 2021

(87) PCT Pub. No.: WO2020/196481
PCT Pub. Date: Oct. 1, 2020

(65) Prior Publication Data
US 2022/0166037 A1 May 26, 2022

(30) Foreign Application Priority Data
Mar. 28, 2019 (JP) .................................. 2019-064016

(51) Int. Cl.
*F04D 29/28* (2006.01)
*H01M 8/04111* (2016.01)
(Continued)

(52) U.S. Cl.
CPC ....... *H01M 8/04111* (2013.01); *F04D 29/284* (2013.01); *F04D 29/4206* (2013.01);
(Continued)

(58) Field of Classification Search
CPC ...... F04D 29/284; F04D 29/30; F04D 29/286; F04D 29/324; F04D 29/384;
(Continued)

(56) References Cited

U.S. PATENT DOCUMENTS 5,685,696 A * 11/1997 Zangeneh ............. F04D 29/284
416/186 R
6,595,746 B1 * 7/2003 Goto ...................... F04D 29/444
415/208.2
(Continued)

FOREIGN PATENT DOCUMENTS

JP 2010-144537 A 7/2010
JP 2017-193982 A 10/2017

OTHER PUBLICATIONS

International Search Report in International Patent Application No. PCT/JP2020/012903, dated Jun. 16, 2020.

*Primary Examiner* — Justin D Seabe
*Assistant Examiner* — Behnoush Haghighian
(74) *Attorney, Agent, or Firm* — Greenblum & Bernstein, P.L.C.

(57) ABSTRACT

A fuel cell centrifugal compressor includes: an impeller including a hub and blades; and a shroud. A smaller one of angles formed by each blade and a meridian surface is a blade angle. An absolute value of the blade angle on a hub-side of the blade is local minimum between hub-side front and rear edges of the blade. An absolute value of the blade angle on a shroud-side of the blade is local minimum between shroud-side front and rear edges of the blade. The hub-side of the blade is constantly less than or equal to the shroud-side of the blade in absolute value of the blade angle between the hub-side front and rear edges. The shroud-side rear edge is less than the shroud-side front edge in absolute value of the blade angle. The hub-side rear edge is greater (Continued)

than the hub-side front edge in absolute value of the blade angle.

2 Claims, 3 Drawing Sheets

(51) Int. Cl.
    *F04D 29/42*     (2006.01)
    *F04D 29/30*     (2006.01)
    *F01D 5/04*     (2006.01)
    *F01D 5/14*     (2006.01)

(52) U.S. Cl.
    CPC .............. *F01D 5/048* (2013.01); *F01D 5/141* (2013.01); *F04D 29/30* (2013.01); *F05D 2240/303* (2013.01); *F05D 2240/304* (2013.01); *F05D 2250/70* (2013.01); *H01M 2250/20* (2013.01)

(58) Field of Classification Search
    CPC ...... F04D 29/242; F04D 17/122; F04D 17/10; F01D 5/141; F01D 5/048
    See application file for complete search history.

(56) References Cited

U.S. PATENT DOCUMENTS

| | | | | |
|---|---|---|---|---|
| 6,877,955 B2* | 4/2005 | Higashimori | ............. | F01D 5/14 416/185 |
| 7,207,767 B2* | 4/2007 | Ashihara | ............. | F04D 29/2277 415/143 |
| 8,128,356 B2* | 3/2012 | Higashimori | ......... | F01D 17/148 415/205 |
| 8,308,420 B2* | 11/2012 | Yagi | ........................ | F04D 29/30 415/1 |
| 8,475,131 B2* | 7/2013 | Shibata | ................. | F04D 29/284 416/182 |
| 8,517,664 B2* | 8/2013 | Sun | ........................ | F04D 29/30 416/182 |
| 8,602,730 B2* | 12/2013 | Richter | ................. | F04D 29/444 415/206 |
| 9,033,667 B2* | 5/2015 | Iwakiri | ................... | F04D 29/30 416/183 |
| 9,039,374 B2* | 5/2015 | Osako | ..................... | F01D 25/24 416/185 |
| 9,822,793 B2* | 11/2017 | Sezal | ..................... | F04D 29/441 |
| 9,964,116 B2* | 5/2018 | Watanabe | ........... | F04D 29/2277 |
| 10,030,667 B2* | 7/2018 | Pirouzpanah | ......... | F04D 25/08 |
| 10,221,854 B2* | 3/2019 | Yamashita | ........... | F04D 17/122 |
| 10,309,413 B2* | 6/2019 | Saito | ..................... | F04D 29/284 |
| 10,634,157 B2* | 4/2020 | Rubino | ................. | F04D 17/122 |
| 10,760,587 B2* | 9/2020 | Larosiliere | ........... | F04D 29/284 |
| 10,801,514 B2* | 10/2020 | Cao | ......................... | F04D 29/681 |
| 10,865,804 B2* | 12/2020 | Mikami | ................. | F04D 29/30 |
| 11,306,734 B2* | 4/2022 | Koga | ..................... | F04D 29/682 |
| 11,572,888 B2* | 2/2023 | Yagi | ..................... | F04D 29/286 |
| 2004/0105756 A1* | 6/2004 | Higashimori | ........... | F01D 5/14 415/206 |
| 2007/0243064 A1* | 10/2007 | Nakano | ................. | F04D 29/384 416/63 |
| 2009/0035122 A1* | 2/2009 | Yagi | ........................ | F04D 29/30 416/223 R |
| 2010/0129224 A1* | 5/2010 | Shibata | ................. | F04D 29/284 416/182 |
| 2010/0272564 A1* | 10/2010 | Richter | ................. | F04D 29/444 415/208.1 |
| 2011/0173975 A1* | 7/2011 | Sun | ........................ | F04D 29/284 60/605.2 |
| 2012/0189454 A1* | 7/2012 | Iwakiri | ................. | F04D 29/284 416/223 R |
| 2013/0129524 A1* | 5/2013 | Sargent | ................. | F04D 29/242 416/243 |
| 2015/0086396 A1* | 3/2015 | Nasir | ..................... | F01D 5/141 417/407 |
| 2015/0300178 A1* | 10/2015 | Osako | ..................... | F01D 25/24 416/223 R |
| 2016/0195094 A1* | 7/2016 | Yamashita | ........... | F04D 29/284 416/204 R |
| 2016/0238019 A1* | 8/2016 | Kobayashi | ........... | F04D 29/286 |
| 2017/0234323 A1* | 8/2017 | Pirouzpanah | ......... | F04D 29/424 417/321 |
| 2017/0298951 A1* | 10/2017 | Itoh | ........................ | F04D 29/30 |
| 2018/0347581 A1* | 12/2018 | Mikami | ................. | F04D 29/30 |
| 2019/0271326 A1* | 9/2019 | Cao | ......................... | F01D 5/048 |
| 2020/0355198 A1* | 11/2020 | Honda | ................... | F04D 29/30 |

\* cited by examiner

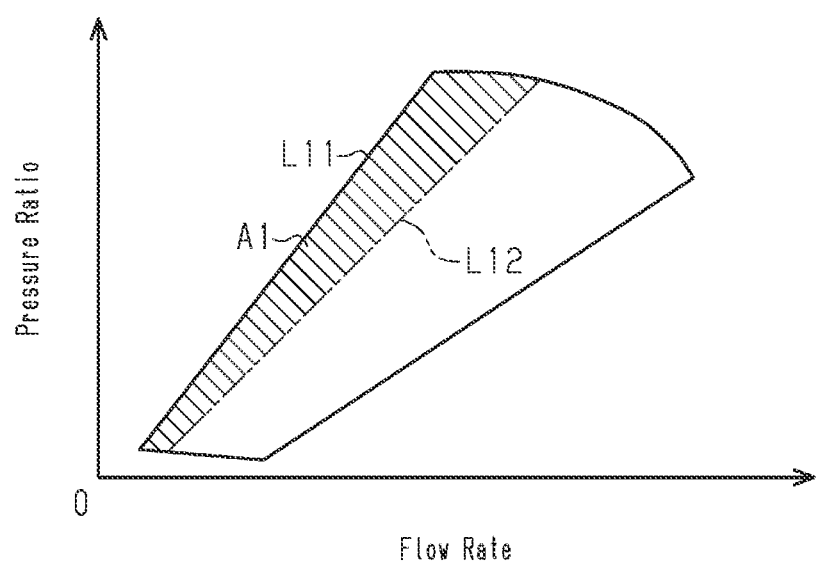

CENTRIFUGAL COMPRESSOR FOR FUEL CELL

TECHNICAL FIELD

The present disclosure relates to a fuel cell centrifugal compressor that compresses oxidant gas supplied to a fuel cell stack.

BACKGROUND ART

Recently-available vehicles are equipped with a fuel cell system including a fuel cell stack in which electric power is generated through the chemical reaction of hydrogen serving as fuel gas and oxygen contained in air serving as oxidant gas. Patent Document 1 discloses an example of a fuel cell system that includes a fuel cell centrifugal compressor that compresses the air supplied to a fuel cell stack.

The fuel cell centrifugal compressor includes an impeller that compresses air. The impeller includes a hub that rotates integrally with a rotary shaft and blades laid out in the circumferential direction of the hub. Further, the fuel cell centrifugal compressor includes a shroud that opposes the hub and defines an impeller chamber. The impeller chamber accommodates an impeller.

PRIOR ART DOCUMENTS

Patent Documents

Patent Document 1: Japanese Laid-Open Patent Publication No. 2010-144537

SUMMARY OF THE INVENTION

Problems that the Invention is to Solve

In the fuel cell system, when, for example, the fuel cell stack is excessively supplied with air, the humidity in the fuel cell stack decreases. Even if the flow rate of air supplied to the fuel cell stack is low, the humidity in the fuel cell stack is easily decreased when the pressure of the air supplied to the fuel cell stack is low. The decrease in the humidity in the fuel cell stack lowers the electric power generation efficiency of the fuel cell stack. Thus, maintaining the electric power generation efficiency requires high-pressured air to be supplied to the fuel cell stack when the flow rate of the air supplied to the fuel cell stack is low.

However, in the fuel cell centrifugal compressor, when the flow rate of air flowing along the blades is low, surging occurs so that the flow of the air along the blades reverses. Especially, surging easily occurs when the flow rate of the air flowing along the blades is low and the discharge pressure is high. The occurrence of surging causes the fuel cell centrifugal compressor to operate unstably.

It is an object of the present disclosure to provide a fuel cell centrifugal compressor capable of preventing the occurrence of surging when the flow rate of the oxidant gas flowing along blades is low and the discharge pressure is high.

Means for Solving the Problem

A fuel cell centrifugal compressor that achieves the above-described objective includes: an impeller that includes a hub and blades and is configured to compress oxidant gas supplied to a fuel cell stack, the hub being configured to rotate integrally with a rotary shaft, the blades being laid out in a circumferential direction of the hub; and a shroud that opposes the hub and defines an impeller chamber, the impeller chamber accommodating the impeller. A smaller one of angles formed by each of the blades and a meridian surface is defined as a blade angle. An absolute value of the blade angle on a side of the hub of the blade has a local minimum value between a hub-side front edge and a hub-side rear edge of the blade. An absolute value of the blade angle on a side of the shroud of the blade has a local minimum value between a shroud-side front edge and a shroud-side rear edge of the blade. The absolute value of the blade angle on the side of the hub of the blade is constantly less than or equal to the absolute value of the blade angle on the side of the shroud of the blade between the hub-side front edge and the hub-side rear edge. The absolute value of the blade angle of the shroud-side rear edge is less than the absolute value of the blade angle of the shroud-side front edge. The absolute value of the blade angle of the hub-side rear edge is greater than the absolute value of the blade angle of the hub-side front edge.

BRIEF DESCRIPTION OF THE DRAWINGS

FIG. 5 is a graph showing the pressure ratio and the flow rate of the fuel cell centrifugal compressor.

MODES FOR CARRYING OUT THE INVENTION

A fuel cell centrifugal compressor according to an embodiment will now be described with reference to FIGS. 1 to 5. The fuel cell centrifugal compressor of the present embodiment is used in, for example, a fuel cell system incorporated in a vehicle such as a fuel cell electric vehicle.

Figure 1:
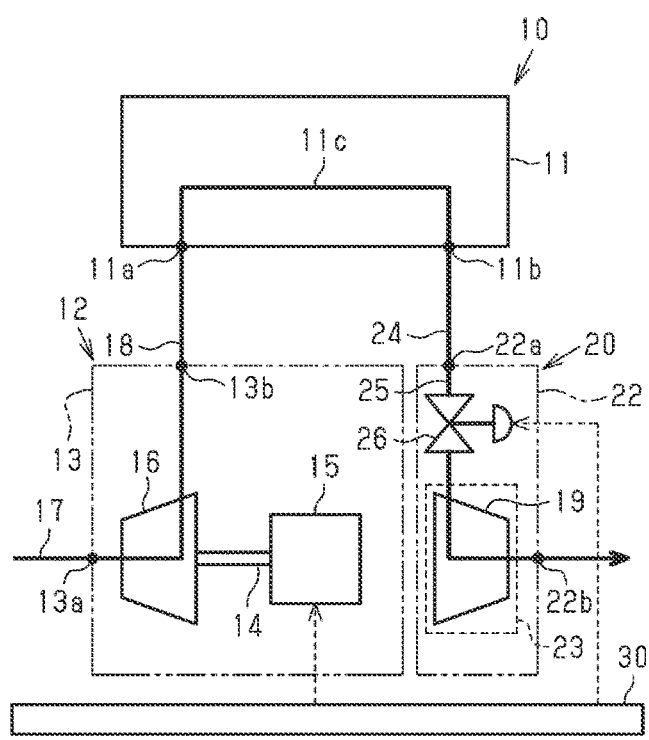
FIG. 1 is a view schematically showing a fuel cell system according to an embodiment.

As shown in FIG. 1, a fuel cell system 10 includes a fuel cell stack 11 and a fuel cell centrifugal compressor 12 that compresses air serving as oxidant gas. The fuel cell stack 11 is supplied with the air compressed by the fuel cell centrifugal compressor 12. The fuel cell stack 11 includes, for example, cells. Each cell includes a stacked structure of an oxygen electrode, a hydrogen electrode, and an electrolyte film arranged between the two electrodes. In the fuel cell stack 11, electric power is generated through the chemical reaction of hydrogen serving as fuel gas and oxygen contained in air.

The fuel cell stack 11 is electrically connected to a travel motor (not shown). The travel motor is driven using the electric power generated by the fuel cell stack 11 as an electric power source. The power of the travel motor is transmitted to the axle through a power transmission mechanism (not shown) so that the vehicle travels at a vehicle speed corresponding to an accelerator open degree of the accelerator pedal.

The fuel cell stack 11 includes a supply port 11a into which air is supplied, a discharge port 11b out of which air is discharged as discharge gas, and a connection passage 11c that connects the supply port 11a to the discharge port 11b.

In the connection passage 11c, the air supplied from the supply port 11a flows toward the discharge port 11b.

The fuel cell centrifugal compressor 12 includes a housing 13, a rotary shaft 14, and an electric motor 15. The rotary shaft 14 and the electric motor 15 are accommodated in the housing 13. The electric motor 15 rotates the rotary shaft 14. The electric motor 15 is driven by the supply of the electric power from a battery (not shown) so as to rotate the rotary shaft 14.

The fuel cell centrifugal compressor 12 further includes an impeller 16 that rotates so as to compress air. The impeller 16 is connected to one end of the rotary shaft 14. As the rotary shaft 14 rotates, the impeller 16 rotates integrally with the rotary shaft 14. In the fuel cell centrifugal compressor 12, when the impeller 16 rotates, a compression operation is performed.

The housing 13 includes a suction port 13a into which air is drawn and an outlet 13b out of which air is discharged. The fuel cell system 10 further includes a compressor passage 17. The compressor passage 17 is, for example, a pipe. One end of the compressor passage 17 is exposed to the atmosphere. The other end of the compressor passage 17 is connected to the suction port 13a. External air flows through the compressor passage 17 and is drawn into the suction port 13a. The fuel cell centrifugal compressor 12 compresses the air drawn from the suction port 13a. The air compressed by the fuel cell centrifugal compressor 12 is discharged out of the outlet 13b.

The fuel cell system 10 includes a supply passage 18 that connects the fuel cell centrifugal compressor 12 to the fuel cell stack 11. The supply passage 18 is, for example, a pipe. One end of the supply passage 18 is connected to the outlet 13b. The other end of the supply passage 18 is connected to the supply port 11a. The air discharged out of the outlet 13b flows through the supply passage 18 and is supplied to the supply port 11a.

The fuel cell system 10 includes a turbine 20 with a turbine wheel 19 that is rotated by the discharge gas discharged from the fuel cell stack 11. The turbine 20 includes a turbine housing 22. The turbine 20 includes a turbine chamber 23 that is defined in the turbine housing 22. The turbine chamber 23 accommodates the turbine wheel 19.

The turbine housing 22 includes an inlet 22a into which discharge gas is drawn and a discharge port 22b out of which the discharge gas that has passed through the turbine chamber 23 is discharged. Further, the fuel cell system 10 includes a discharge passage 24 that connects the fuel cell stack 11 to the turbine 20. The discharge passage 24 is, for example, a pipe. One end of the discharge passage 24 is connected to the discharge port 11b. The other end of the discharge passage 24 is connected to the inlet 22a. The discharge gas discharged out of the discharge port 11b flows through the discharge passage 24 and is drawn into the inlet 22a.

The turbine 20 includes a drawing passage 25 that connects the turbine chamber 23 to the discharge passage 24. The discharge gas flowing through the discharge passage 24 is drawn into the turbine chamber 23 through the drawing passage 25. The drawing passage 25 is located in the turbine housing 22 and connects the inlet 22a to the turbine chamber 23. Thus, the drawing passage 25 is connected to the discharge passage 24 through the inlet 22a. The turbine wheel 19 is rotated by the discharge gas discharged out of the fuel cell stack 11 and drawn into the turbine chamber 23 through the discharge passage 24, the inlet 22a, and the drawing passage 25.

In the fuel cell system 10, when the turbine wheel 19 rotates, the discharge energy of the discharge gas is extracted as mechanical energy so that the motor (not shown) connected to the turbine wheel 19 functions as an electric generator, thereby generating a regenerative electric power in the motor. The regenerative electric power generated in the motor is stored in the battery (not shown) and used as, for example, an electric power source for the travel motor.

The turbine 20 includes a pressure-adjusting valve 26 that adjusts the cross-sectional flow area of the drawing passage 25 and adjusts the pressure of air supplied to the fuel cell stack 11. The pressure-adjusting valve 26 includes, for example, nozzle vanes laid out in the circumferential direction at an outer circumferential position of the turbine wheel 19 and a rotation mechanism that rotates the nozzle vanes. The cross-sectional flow area of the drawing passage 25 is adjusted by the rotation mechanism rotating the nozzle vanes.

The fuel cell stack 11 includes a control device 30. The control device 30 is electrically connected to the electric motor 15. The control device 30 controls the driving of the electric motor 15. Further, the control device 30 is electrically connected to the pressure-adjusting valve 26. The control device 30 refers to, for example, the mode of operating the accelerator pedal to calculate a requested electric power generation amount requested by the fuel cell stack 11. The control device 30 refers to the requested electric power generation amount to obtain a target open degree of the pressure-adjusting valve 26. The control device 30 controls the open degree of the pressure-adjusting valve 26 such that the open degree of the pressure-adjusting valve 26 becomes the obtained target open degree. The pressure of air supplied to the fuel cell stack 11 is adjusted by the control device 30 controlling the open degree of the pressure-adjusting valve 26. The open degree of the pressure-adjusting valve 26 corresponds to a rotation angle of each of the nozzle vanes. The humidity in the fuel cell stack 11 is adjusted by adjusting the pressure of the air supplied to the fuel cell stack 11. For the electric power to be effectively generated in the fuel cell stack 11, the humidity in the fuel cell stack 11 is adjusted to a desired humidity that has been defined in advance.

Figure 2:
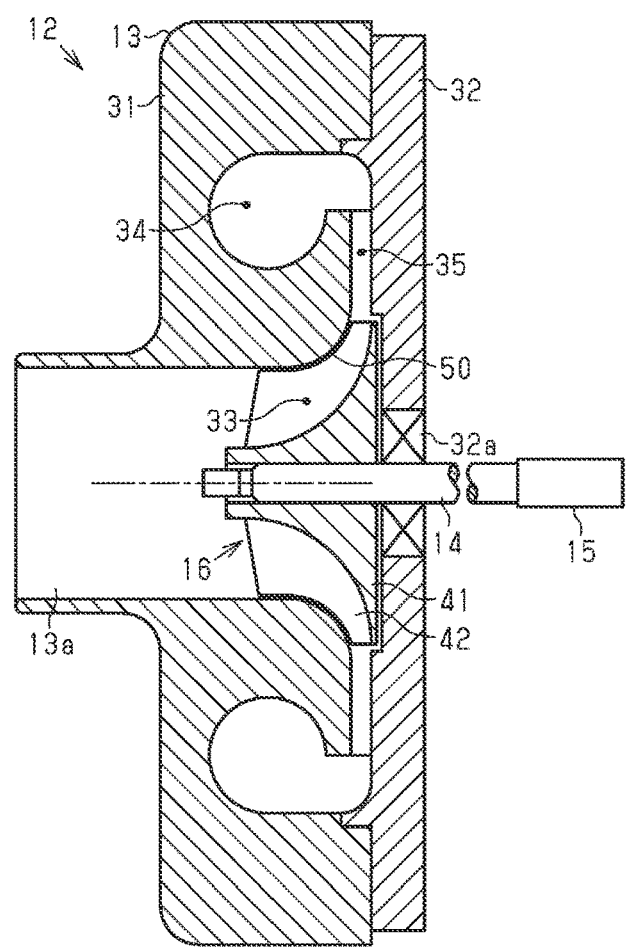
FIG. 2 is a side cross-sectional view showing a portion of the fuel cell centrifugal compressor.

As shown in FIG. 2, the housing 13 includes a compressor housing 31 and a bearing housing 32. The compressor housing 31 includes the suction port 13a and has a tubular shape with a closed end. The bearing housing 32 has a circular shape and closes the opening of the compressor housing 31. The compressor housing 31 includes an impeller chamber 33 that accommodates the impeller 16. The impeller chamber 33 connects to the suction port 13a. One end of the rotary shaft 14 extends through the bearing housing 32 and protrudes into the impeller chamber 33. The rotary shaft 14 is rotationally supported at the bearing housing 32 by a bearing 32a. The suction port 13a extends in the axial direction of the rotary shaft 14.

The compressor housing 31 includes a discharge chamber 34 out of which the air compressed by the impeller 16 is discharged and a diffuser passage 35 that connects the impeller chamber 33 to the discharge chamber 34. The diffuser passage 35 is located on the outer side of the impeller chamber 33 in the radial direction of the rotary shaft 14 and has an annular shape around the impeller 16 (impeller chamber 33). The discharge chamber 34 has an annular shape and is located on the outer side of the diffuser passage 35 in the radial direction of the rotary shaft 14. The air compressed by the impeller 16 passes through the diffuser passage 35 so that the air is further compressed and then discharged to the discharge chamber 34. The air in the discharge chamber 34 is discharged from the outlet 13b to the supply passage 18 and supplied through the supply passage 18 and the supply port 11a to the fuel cell stack 11. Accordingly, the impeller 16 compresses the air supplied to the fuel cell stack 11.

Figure 3:
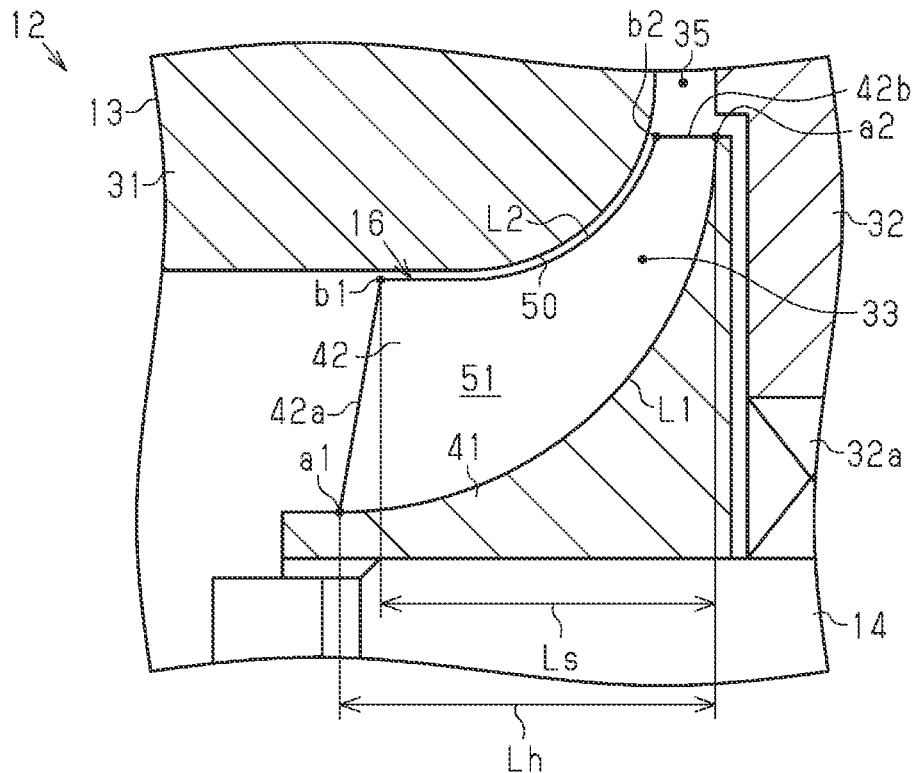
FIG. 3 is a diagram showing the shape of a meridian surface of the impeller.

As shown in FIG. 3, the impeller 16 includes a hub 41 that rotates integrally with the rotary shaft 14 and blades 42 laid out in the circumferential direction of the hub 41. The hub 41 is coupled to one end of the rotary shaft 14. The hub 41 has a substantially conical shape in which its outer diameter increases from the front end proximate to the suction port 13a toward the rear end. The hub 41 includes a curved surface that is recessed toward the axis of the rotary shaft 14. The blades 42 are arranged at equal intervals in the circumferential direction on the hub 41. Since the outer diameter of the hub 41 increases from the front end toward the rear end, the distance between adjacent ones of the blades 42 in the circumferential direction of the hub 41 gradually increases from the front end toward the rear end of the hub 41.

The fuel cell centrifugal compressor 12 includes a shroud 50 that defines the impeller chamber 33. In the present embodiment, the shroud 50 is a part of the compressor housing 31. The shroud 50 opposes the hub 41 and extends along the surface of the hub 41. The shroud 50 surrounds the blades 42. Two adjacent ones of the blades 42 in the circumferential direction of the hub 41, the hub 41, and the shroud 50 define an inter-blade passage 51.

FIG. 3 shows the shape of a meridian surface of each of the blades 42. The blade 42 includes a hub-side meridian L1 that is closer to the hub 41 and a shroud-side meridian L2 that is closer to the shroud 50. The meridian surface of the blade 42 refers to a vertical cross-section that passes through the hub-side meridian L1, the shroud-side meridian L2, and the axis of the rotary shaft 14. The front end of the hub-side meridian L1 is a hub-side front edge a1 of the blade 42. The rear end of the hub-side meridian L1 is a hub-side rear edge a2 of the blade 42. The front end of the shroud-side meridian L2 is a shroud-side front edge b1 of the blade 42. The rear end of the shroud-side meridian L2 is a shroud-side rear edge b2 of the blade 42. The edge connecting the hub-side front edge a1 to the shroud-side front edge b1 is a front edge 42a of the blade 42. The edge connecting the hub-side rear edge a2 to the shroud-side rear edge b2 is a rear edge 42b of the blade 42.

Distance Lh from the hub-side rear edge a2 to the hub-side front edge a1 of the blade 42 in the axial direction of the rotary shaft 14 is longer than distance Ls from the hub-side rear edge a2 to the shroud-side front edge b1 in the axial direction of the rotary shaft 14.

The hub-side meridian L1 determines the shape of the blade 42 on the side of the hub 41 (i.e., the shape of the basal end). The shroud-side meridian L2 determines the shape of the blade 42 on the side of the shroud 50 (i.e., the shape of the distal end). As a result, the entire shape of the blade 42 is three-dimensional. The hub-side meridian L1 is a curved line that is quantified by a blade angle β formed by the blade 42 and the meridian surface. The shroud-side meridian L2 is a curved line that is quantified by the blade angle β formed by the blade 42 and the meridian surface. In the present embodiment, the smaller one of the angles formed by the blade 42 and the meridian surface is defined as the blade angle β. The blade angle β of the hub-side meridian L1 is different from the blade angle β of the shroud-side meridian L2. The blade angle β has a different value depending on the position on the hub-side meridian L1. The blade angle β has a different value depending on the position on the shroud-side meridian L2. The blade angle β at a certain position on the hub-side meridian L1 is defined as the blade angle β of the hub-side meridian L1 or a hub-side blade angle β. The blade angle β at a certain position on the shroud-side meridian L2 is defined as the blade angle β of the shroud-side meridian L2 or a shroud-side blade angle β.

Figure 4:
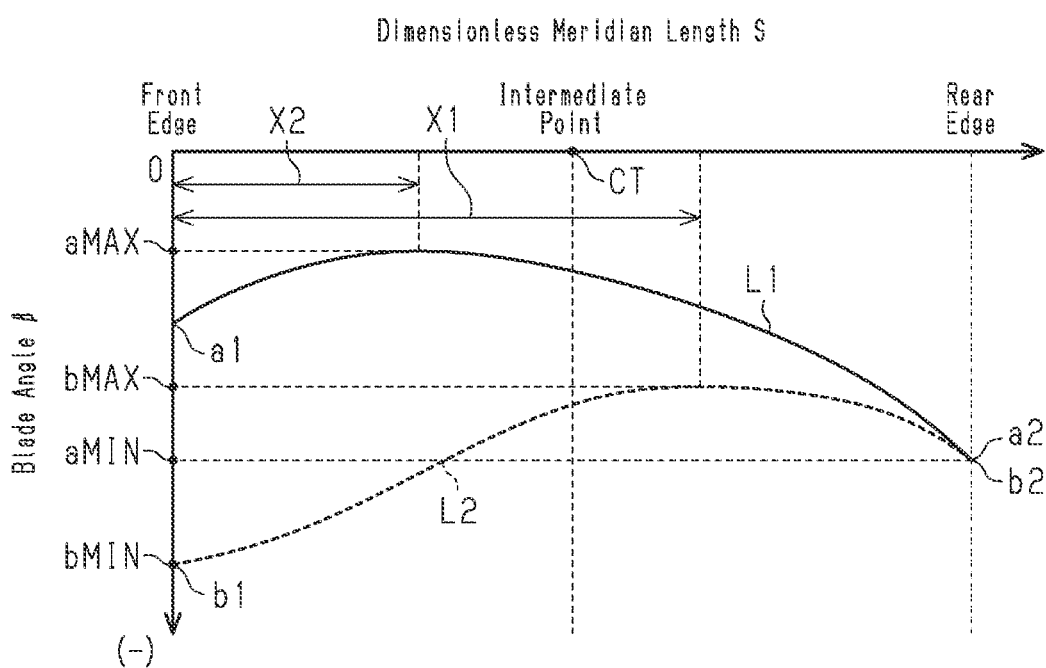
FIG. 4 is a graph showing the relationship between the blade angle and a dimensionless meridian length.

In FIG. 4, the vertical axis represents the blade angle β of the blade 42, and the horizontal axis represents a dimensionless meridian length S. The blade angle β has a negative value.

The blade angle β of the hub-side meridian L1 has a local maximum value aMAX between the hub-side front edge a1 and the hub-side rear edge a2 of the blade 42. Accordingly, the absolute value of the blade angle β on the side of the hub 41 of the blade 42 has a local minimum value between the hub-side front edge a1 and the hub-side rear edge a2 of the blade 42. The blade angle β of the hub-side meridian L1 has the local maximum value aMAX at a point on the hub-side meridian L1 closer to the hub-side front edge a1 than an intermediate point CT.

The blade angle β of the shroud-side meridian L2 has a local maximum value bMAX between the shroud-side front edge b1 and the shroud-side rear edge b2 of the blade 42. Accordingly, the absolute value of the blade angle β on the side of the shroud 50 of the blade 42 has a local minimum value between the shroud-side front edge b1 and the shroud-side rear edge b2 of the blade 42. The blade angle β of the shroud-side meridian L2 has the local maximum value bMAX at a point on the shroud-side meridian L2 closer to the shroud-side rear edge b2 than the intermediate point CT.

The blade angle β of the hub-side meridian L1 is constantly greater than or equal to the blade angle β of the shroud-side meridian L2 between the hub-side front edge a1 and the hub-side rear edge a2. Accordingly, the absolute value of the blade angle β on the side of the hub 41 of the blade 42 is constantly less than or equal to the absolute value of the blade angle β on the side of the shroud 50 of the blade 42 between the hub-side front edge a1 and the hub-side rear edge a2.

The blade angle β of the shroud-side rear edge b2 is greater than the blade angle β of the shroud-side front edge b1. Accordingly, the absolute value of the blade angle β of the shroud-side rear edge b2 is less than the absolute value of the blade angle β of the shroud-side front edge b1. The blade angle β of the shroud-side front edge b1 is a minimum value bMIN at the blade angle β of the shroud-side meridian L2.

The blade angle β of the hub-side rear edge a2 coincides with the blade angle β of the shroud-side rear edge b2. The blade angle β of the hub-side rear edge a2 has a minimum value aMIN at the blade angle β of the hub-side meridian L1. The blade angle β of the hub-side rear edge a2 is less than the blade angle β of the hub-side front edge a1. Accordingly, the absolute value of the blade angle β of the hub-side rear edge a2 is greater than the absolute value of the blade angle β of the hub-side front edge a1.

Length X1 of the shroud-side meridian L2 from the shroud-side front edge b1 to a point where the blade angle β of the shroud-side meridian L2 has a local maximum value is two or more times greater than length X2 of the hub-side meridian L1 from the hub-side front edge a1 to a point where the blade angle β of the hub-side meridian L1 has a local maximum value.

The operation of the present embodiment will now be described.

Regarding the blade 42 of the impeller 16, the absolute value of the blade angle β on the side of the hub 41 of the blade 42 has the local minimum value between the hub-side front edge a1 and the hub-side rear edge a2 of the blade 42.

The absolute value of the blade angle β on the side of the shroud 50 of the blade 42 has the local minimum value between the shroud-side front edge b1 and the shroud-side rear edge b2 of the blade 42. The absolute value of the blade angle β on the side of the hub 41 of the blade 42 is constantly less than or equal to the absolute value of the blade angle β on the side of the shroud 50 of the blade 42 between the hub-side front edge a1 and the hub-side rear edge a2. The absolute value of the blade angle β of the shroud-side rear edge b2 is less than the absolute value of the blade angle β of the shroud-side front edge b1.

Regarding the blade 42 designed in such a manner, the inventors found that when the absolute value of the blade angle β of the hub-side rear edge a2 is less than the absolute value of the blade angle β of the hub-side front edge a1 and the flow rate of air flowing along the blade 42 (inter-blade passage 51) is low, surging occurs so that the flow of the air along the blade 42 reverses. Especially, surging easily occurs when the discharge pressure is high and the low flow rate of the air flowing along the blade 42 is low. In the present embodiment, the absolute value of the blade angle β of the hub-side rear edge a2 is set to be greater than the absolute value of the blade angle β of the hub-side front edge a1.

FIG. 5 illustrates a surge line L11 of the present embodiment that connects limit points where surging does not occur and a surge line L12 of a comparative example shown by the long dashed double-short dashed line in FIG. 5. The surge line L11 moves in a direction in which its flow rate becomes lower than the flow rate of the surge line L12. In FIG. 5, the surge line L12 is shown as the comparative example in a case where the absolute value of the blade angle β of the hub-side rear edge a2 is less than the absolute value of the blade angle β of the hub-side front edge a1.

In this manner, the operating region of the fuel cell centrifugal compressor 12 is enlarged by an amount corresponding to region μl shown by the oblique line in FIG. 5. Thus, the operating region of the fuel cell centrifugal compressor 12 is enlarged when the flow rate of the air flowing along the blade 42 is low and the discharge pressure is high. This prevents the occurrence of surging when the flow rate of the air flowing along the blade 42 is low and the discharge pressure is high.

In the fuel cell system 10, when, for example, the fuel cell stack 11 is excessively supplied with air, the humidity in the fuel cell stack 11 decreases. Even if the flow rate of air supplied to the fuel cell stack 11 is low, the humidity in the fuel cell stack 11 is easily decreased when the pressure of the air supplied to the fuel cell stack 11 is low. The decrease in the humidity in the fuel cell stack 11 lowers the electric power generation efficiency of the fuel cell stack 11. Thus, maintaining the electric power generation efficiency of the fuel cell stack 11 requires high-pressured air to be supplied to the fuel cell stack 11 when the flow rate of the air supplied to the fuel cell stack 11 is low.

In the fuel cell centrifugal compressor 12 of the present embodiment, the operating region of the fuel cell centrifugal compressor 12 is enlarged when the flow rate of the air flowing along the blade 42 is low and the discharge pressure is high. This prevents the occurrence of surging when the flow rate of the air flowing along the blade 42 is low and the discharge pressure is high. Thus, when the flow rate of the air supplied to the fuel cell stack 11 is low, the pressure of the air supplied to the fuel cell stack 11 is set to be high. This maintains the electric power generation efficiency of the fuel cell stack 11.

The above-described embodiment provides the following advantage.

(1) Regarding the blade 42 designed in the above-described manner, the inventors found that when the absolute value of the blade angle β of the hub-side rear edge a2 is less than the absolute value of the blade angle β of the hub-side front edge a1 and the flow rate of the air flowing along the blade 42 is low, surging occurs so that the flow of the air along the blade 42 reverses. Especially, surging easily occurs when the discharge pressure is high and the flow rate of the air flowing along the blade 42 is low. In the present embodiment, the absolute value of the blade angle β of the hub-side rear edge a2 is set to be greater than the absolute value of the blade angle β of the hub-side front edge a1. Thus, the operating region of the fuel cell centrifugal compressor 12 is enlarged when the flow rate of the air is low and the discharge pressure is high. This prevents the occurrence of surging when the flow rate of the air flowing along the blade 42 is low and the discharge pressure is high.

The above-described embodiment may be modified as follows. The above-described embodiment and the following modifications can be combined as long as the combined modifications remain technically consistent with each other.

In the embodiment, the blade angle β of the hub-side meridian L1 may have the local maximum value aMAX at, for example, a point on the hub-side meridian L1 closer to the hub-side rear edge a2 than the intermediate point CT.

In the embodiment, the blade angle β of the hub-side meridian L1 may have the local maximum value aMAX at, for example, the intermediate point CT of the hub-side meridian L1.

In the embodiment, the blade angle β of the shroud-side meridian L2 may have the local maximum value aMAX at, for example, a point on the shroud-side meridian L2 closer to the shroud-side front edge b1 than the intermediate point CT.

In the embodiment, the blade angle β of the shroud-side meridian L2 may have the local maximum value bMAX at, for example, the intermediate point CT of the shroud-side meridian L2.

In the embodiment, the blade angle β of the hub-side rear edge a2 does not have to coincide with the blade angle β of the shroud-side rear edge b2, and the blade angle β of the hub-side rear edge a2 may be greater than the blade angle β of the shroud-side rear edge b2. That is, the absolute value of the blade angle β of the hub-side rear edge a2 may be less than the absolute value of the blade angle β of the shroud-side rear edge b2. In short, the absolute value of the blade angle β on the side of the hub 41 of the blade 42 simply needs to be constantly less than or equal to the absolute value of the blade angle β on the side of the shroud 50 of the blade 42 between the hub-side front edge a1 and the hub-side rear edge a2.

In the embodiment, distance Lh from the hub-side rear edge a2 to the hub-side front edge a1 of the blade 42 in the axial direction of the rotary shaft 14 may be equal to distance Ls from the hub-side rear edge a2 to the shroud-side front edge b1 in the axial direction of the rotary shaft 14.

In the embodiment, distance Lh from the hub-side rear edge a2 to the hub-side front edge a1 of the blade 42 in the axial direction of the rotary shaft 14 may be shorter than distance Ls from the hub-side rear edge a2 to the shroud-side front edge b1 in the axial direction of the rotary shaft 14.

In the embodiment, length X1 of the shroud-side meridian L2 from the shroud-side front edge b1 to the point where the blade angle β of the shroud-side meridian L2 has the local maximum value does not need to be two or more times greater than length X2 of the hub-side meridian L1 from the hub-side front edge a1 to the point where the blade angle β of the hub-side meridian L1 has the local maximum value.

In the embodiment, the shroud 50 is a part of the compressor housing 31. Instead, the shroud may be separate from the compressor housing 31.

In the embodiment, the oxidant gas may be any type of oxygen-containing gas.

In the embodiment, the fuel cell centrifugal compressor 12 does not have to be used in the fuel cell system 10 incorporated in a vehicle such as a fuel cell electric vehicle.

The invention claimed is:

1. A fuel cell centrifugal compressor, comprising:
an impeller that includes a hub and blades and is configured to compress oxidant gas supplied to a fuel cell stack, the hub being configured to rotate integrally with a rotary shaft, the blades being laid out in a circumferential direction of the hub; and
a shroud that opposes the hub and defines an impeller chamber, the impeller chamber accommodating the impeller, wherein
a smaller one of angles formed by each of the blades and a meridian surface is defined as a blade angle,
an absolute value of the blade angle on a side of the hub of the blade has a local minimum value between a hub-side front edge and a hub-side rear edge of the blade,
an absolute value of the blade angle on a side of the shroud of the blade has a local minimum value between a shroud-side front edge and a shroud-side rear edge of the blade,
the absolute value of the blade angle on the side of the hub of the blade is constantly less than or equal to the absolute value of the blade angle on the side of the shroud of the blade between the hub-side front edge and the hub-side rear edge,
the absolute value of the blade angle of the shroud-side rear edge is less than the absolute value of the blade angle of the shroud-side front edge,
the absolute value of the blade angle of the hub-side rear edge is greater than the absolute value of the blade angle of the hub-side front edge,
the blade includes a hub-side meridian that is closer to the hub and a shroud-side meridian that is closer to the shroud,
the blade angle of the hub-side meridian has a local maximum value at a point on the hub-side meridian closer to the hub-side front edge than a half way midpoint between the hub-side front edge and the hub-side rear edge,
the blade angle of the shroud-side meridian has a local maximum value at a point on the shroud-side meridian closer to the shroud-side rear edge than a half way midpoint between the shroud-side front edge and the shroud-side rear edge, and
a value of the blade angle of the hub-side meridian at the hub-side front edge is greater than the local maximum value of the blade angle of the shroud-side meridian.

2. The fuel cell centrifugal compressor according to claim 1, wherein
a length of the shroud-side meridian from the shroud-side front edge to a point where the blade angle of the shroud-side meridian has the local maximum value is two or more times greater than a length of the hub-side meridian from the hub-side front edge to a point where the blade angle of the hub-side meridian has the local maximum value.

* * * * *